US012687510B2

(12) United States Patent
Suenaga et al.

(10) Patent No.: US 12,687,510 B2
(45) Date of Patent: Jul. 21, 2026

(54) ANALYSIS APPARATUS, SYSTEM, METHOD, AND PROGRAM

(71) Applicant: Rigaku Corporation, Tokyo (JP)

(72) Inventors: Rieko Suenaga, Akishima (JP); Yoshiyasu Ito, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 273 days.

(21) Appl. No.: 18/616,824

(22) Filed: Mar. 26, 2024

(65) Prior Publication Data

US 2024/0328972 A1 Oct. 3, 2024

(30) Foreign Application Priority Data

Mar. 27, 2023 (JP) ................................. 2023-049475
Feb. 22, 2024 (JP) ................................. 2024-025809

(51) Int. Cl.
*G01N 23/2252* (2018.01)
*G01N 23/2055* (2018.01)

(52) U.S. Cl.
CPC ..... *G01N 23/2252* (2013.01); *G01N 23/2055* (2013.01)

(58) Field of Classification Search
CPC ........ G01B 15/00; G01B 15/02; G01B 15/04; G01B 2210/56
See application file for complete search history.

(56) References Cited

U.S. PATENT DOCUMENTS

| | | | |
|---|---|---|---|
| 6,192,103 B1 | 2/2001 | Wormington et al. | |
| 6,303,931 B1 * | 10/2001 | Menaker ................ B82Y 15/00 | |
| | | | 250/307 |
| 2003/0010912 A1 * | 1/2003 | Archie ................ G03F 7/70641 | |
| | | | 716/51 |
| 2003/0049678 A1 * | 3/2003 | Nienaber ........... G01N 33/6803 | |
| | | | 435/7.1 |

(Continued)

FOREIGN PATENT DOCUMENTS

| | | | | |
|---|---|---|---|---|
| CN | 107271468 A | * | 10/2017 | ....... G01N 23/20058 |
| CN | 107271468 B | | 9/2019 | |

OTHER PUBLICATIONS

CN-107271468 translation (Year: 2017).*

(Continued)

*Primary Examiner* — David J Makiya
*Assistant Examiner* — Soorena Kefayati
(74) *Attorney, Agent, or Firm* — XSENSUS LLP

(57) ABSTRACT

An analysis apparatus for calculating an index indicating an optimization degree of a model with respect to measurement data includes processing circuitry configured to calculate an index indicating an optimization degree of a model including information of an electron density distribution with respect to measurement data, a probability distribution function followed by the measurement data being known, acquire the measurement data, acquire calculation data calculated from the model, and calculate an index GOF including a ratio of a residual, which is defined by a predetermined mathematical formula including the measurement data and the calculation data, and an expected value of the residual, which is defined based on the probability distribution function and the predetermined mathematical formula.

11 Claims, 9 Drawing Sheets

(56)                References Cited

U.S. PATENT DOCUMENTS

| | | | | |
|---|---|---|---|---|
| 2010/0017172 A1* | 1/2010 | Statham | ............. | G01N 23/2252 |
| | | | | 703/2 |
| 2010/0278304 A1* | 11/2010 | Mukaide | ................ | A61B 6/484 |
| | | | | 378/53 |
| 2015/0032398 A1* | 1/2015 | Peterlinz | ............. | G01N 23/203 |
| | | | | 702/81 |
| 2017/0023491 A1* | 1/2017 | Cao | ..................... | G03F 7/70625 |
| 2021/0055699 A1* | 2/2021 | Agarwal | ............. | G01N 23/201 |
| 2021/0341397 A1* | 11/2021 | Ginsburg | ............. | G01N 23/201 |
| 2024/0060914 A1* | 2/2024 | Mahvash | ............. | G01N 23/205 |

OTHER PUBLICATIONS

Taiwanese Office Action issued Sep. 19, 2025 in corresponding Taiwanese Patent Application No. 113111437, 12 pages.

Kenji Sakurai, "Introduction to X-ray reflectance method", 2009, pp. 97 (3 pages including English Translation).

Ito et al., "Determination of the pore size distribution and porosity of porous low-dielectric-constant films by grazing incidence x-ray scattering", IOP Publishing, Measurement Science and Technology, vol. 22, No. 024008, Dec. 21, 2010, pp. 1-8.

R. A. Young, "The Rietveld Method", Mathematical Aspects, 1995, pp. 43-51.

Nakai et al., "Progress of Rietveld analysis and evaluation of Results", Practice of powder X-ray analysis (2nd edition), 2009, pp. 125 (2 pages including English Translation).

Nakagawa et al., "Experimental data analysis using the least squares method (new edition)", 2018, pp. 40-42 (6 pages including English Translation).

Japanese Office Action issued Feb. 3, 2026 in corresponding Japanese Patent Application No. 2024-025809, 4 pages.

Fujio Izumi, "5. Rietveld method", Journal of the Crystal Research Society of Japan, 1992, vol. 34, No. 2, pp. 76-85, doi.org/10.5940/jcrsj.34.76.

* cited by examiner

ANALYSIS APPARATUS, SYSTEM, METHOD, AND PROGRAM

CROSS-REFERENCE TO RELATED APPLICATIONS

This application claims priority from Japanese Patent Application No. 2023-049475, filed on Mar. 27, 2023, and Japanese Patent Application No. 2024-025809, filed on Feb. 22, 2024; and the entire contents of Japanese Patent Application No. 2023-049475 and Japanese Patent Application No. 2024-025809 are incorporated herein by reference.

BACKGROUND

Field

The present disclosure relates to an analysis apparatus, a system, a method, and a program for calculating an index indicating an optimization degree of a model.

Description of the Related Art

In the X-ray reflectivity, a logarithmic scale has been used for the optimization calculation because of the wide dynamic range of X-ray reflectivity data (Non-Patent Document 1). In addition, CD (critical dimension) measurement by small angle X-ray scattering (CD-SAXS), which shares the principle of X-ray reflectivity, has also been analyzed on a logarithmic scale for the same reason (Non-Patent Document 2). In these metrologies, the index "R factor" shown in the formula (1) below has been used as a minimization function of the least square optimization. Obs shows the measured intensity, and Calc shows the calculated intensity. This R-factor is also used to assess the optimization convergence.

$$R \ (\%) = 100 \times \sqrt{\frac{\sum_j \{\log(Obs_j) - \log(Calc_j)\}^2}{\sum_j \{\log(Obs_j)\}^2}} \quad (1)$$

On the other hand, in powder X-ray diffraction, the indices shown in the following formula (2) to formula (4) called S factor have been used for convergence determination (Non-Patent Documents 3 and 4). S=1 means that the refinement is perfect, and S<1.3 means that the analysis result is generally considered to be satisfactory. In this way, the S factor can absolutely determine the convergence of the fitting. The S factor, which is a convergence determination index, is defined as different from the minimization function.

$$S = \frac{R_{wp}}{R_e} \quad (2)$$

$$R_{wp} = \sqrt{\frac{\sum_j w_j \{Obs_j - Calc_j\}^2}{\sum_j w_j Obs_j^2}} \quad (3)$$

$$R_{e=} \sqrt{\frac{(n-p)}{\sum_j w_j Obs_j^2}} \quad (4)$$

Note that $R_{wp}$ is an R factor used in powder analysis, and $R_e$ is the smallest estimated R factor. In addition, n represents the number of data points constituting the measurement data, and p represents the number of parameters to be refined. Also, w is a statistical weight parameter defined by the inverse of the error (=variance of statistical fluctuation) included in each data point.

Non-Patent Document

Non-patent Document 1: Kenji Sakurai [Edition], Introduction to X-ray reflectivity method, 2009, p. 97

Non-patent Document 2: Y Ito and K Omote, Meas. Sci. Technol. 22 (2011) 024008 (8pp)

Non-patent Document 3: R. A. Young, The Rietveld Method, 1995 years, p. 43-44, 51

Non-patent Document 4: Izumi Nakai, Fujio Izumi, Practical Powder X-ray Analysis (2nd Edition), 2009, p125

Non-patent Document 5: Toru Nakagawa, Yoshio Oyanagi, Least Squares Experimental Data-Analysis (New Model), 2018, p40-42

As described above, the least square optimization in logarithmic scale is generally performed when analyzing X-ray intensity data with a wide dynamic range, such as X-ray reflectivity and small angle X-ray scattering. In these cases, the normalization by the error is not performed when calculating the minimization function, R factor. The R factor is also used to assess the optimization convergence in such metrologies.

However, the value of this R factor varies with the quality of the measurement data. For example, the value of the R factor decreases for statistically good data. Therefore, the R factor has a smaller value when the measurement time is longer, or the fitting is performed on a limited region with relatively high intensity. Due to this, the analyzer cannot absolutely determine regarding the convergence of fitting based only on the value of the R factor, and can only relatively determine within the same data. For judging whether the analysis is sufficiently converged or not, it has been necessary to rely on the experience of the skilled engineer.

As described above, the S factor is used for the determination of the convergence of the powder X-ray diffraction. $R_e$ included in the S factor is a parameter derived by the definition of $R_{wp}$ and the definition of the least squares method, and the derivation of $R_e$ requires a precondition that the residual sum of squares are normalized by error (Non-Patent Document 5). If normalization with error is applied to data with a wide dynamic range, such as X-ray reflectivity and small angle X-ray scattering data, the weight on the high intensity region becomes large, resulting in the signal in the low intensity region is ignored. In metrology such as X-ray reflectivity and small angle X-ray scattering, the signal in the low intensity region may also contain information necessary for analysis, and this cannot be ignored. Therefore, the normalization with error is not suitable for measurement data in such as X-ray reflectivity and small angle X-ray scattering, and the S factor cannot be applied.

Due to above, a metric to assess the optimization convergence that can be applied to data such as X-ray reflectivity and small angle X-ray scattering has been strongly demanded.

SUMMARY

The present disclosure has been made in view of such circumstances, and an exemplary embodiment of the present disclosure is to provide an analysis apparatus, a system, a method and a program for calculating an evaluation index for convergence of the model optimization.

(1) In an exemplary embodiment, the analysis apparatus of the present disclosure has the following means. That is, an analysis apparatus according to an aspect of the present disclosure is an analysis apparatus for calculating an index indicating an optimization degree of a model including information of an electron density distribution with respect to measurement data, a probability distribution function followed by the measurement data being known, comprising a measurement data acquiring section for acquiring the measurement data, a calculation data acquiring section for acquiring calculation data calculated from the model, and an index calculating section for calculating an index GOF including a ratio of a residual, which is defined by a predetermined mathematical formula including the measurement data and the calculation data, and an expected value of the residual, which is defined based on the probability distribution function and the predetermined mathematical formula.

(2) Further, the analysis apparatus according to an aspect of the present disclosure comprises an index evaluating section for evaluating convergence of the GOF.

(3) Further, in the analysis apparatus according to an aspect of the present disclosure, the predetermined mathematical formula includes a sum of squared residuals of a logarithm of the measurement data and a logarithm of the calculation data.

(4) Further, in the analysis apparatus according to one aspect of the present disclosure, the predetermined mathematical formula includes a weight parameter that multiplies the measurement data by a constant value when the measurement data has an intensity equal to or less than a predetermined value and that takes a logarithm of the measurement data when the measurement data has an intensity more than the predetermined value.

(5) Further, in the analysis apparatus according to an aspect of the present disclosure, the probability distribution function is a Poisson distribution, and the index calculating section calculates an expected value of the residual by approximating the expected value with a Gaussian distribution.

(6) Further, the analysis apparatus according to an aspect of the present disclosure comprises a model generating section that generates the model and calculates the calculation data based on the generated model, wherein the calculation data acquiring section acquires the calculation data calculated by the model generating section, the model generating section outputs the model when the index evaluating section evaluates that the GOF has converged, the model generating section updates a model parameter of the model, generates the model and calculates the calculation data when the index evaluating section evaluates that the GOF has not converged, and the index calculating section calculates the GOF based on the calculated calculation data.

(7) Further, a system according to an aspect of the present disclosure comprises an X-ray analysis apparatus comprising an X-ray generating section for generating X-rays, a sample table for placing a sample, and a detector for detecting X-rays, and an analysis apparatus according to any one of (1) to (6).

(8) Further, a method according to an aspect of the present disclosure is a method for calculating an index indicating an optimization degree of a model including information of an electron density distribution with respect to measurement data, a probability distribution function followed by the measurement data being known, comprising the following steps of: acquiring the measurement data, acquiring calculation data calculated from the model, and calculating an index GOF including a ratio of a residual, which is defined by a predetermined mathematical formula including the measurement data and the calculation data, and an expected value of the residual, which is defined based on the probability distribution function and the predetermined mathematical formula.

(9) Further, a program according to an aspect of the present disclosure is a program for calculating an index indicating an optimization degree of a model including information of an electron density distribution with respect to measurement data, a probability distribution function followed by the measurement data being known, causing a computer to execute the following process of: acquiring the measurement data, acquiring calculation data calculated from the model, and calculating an index GOF including a ratio of a residual, which is defined by a predetermined mathematical formula including the measurement data and the calculation data, and an expected value of the residual, which is defined based on the probability distribution function and the predetermined mathematical formula.

DETAILED DESCRIPTION

Figure 1:
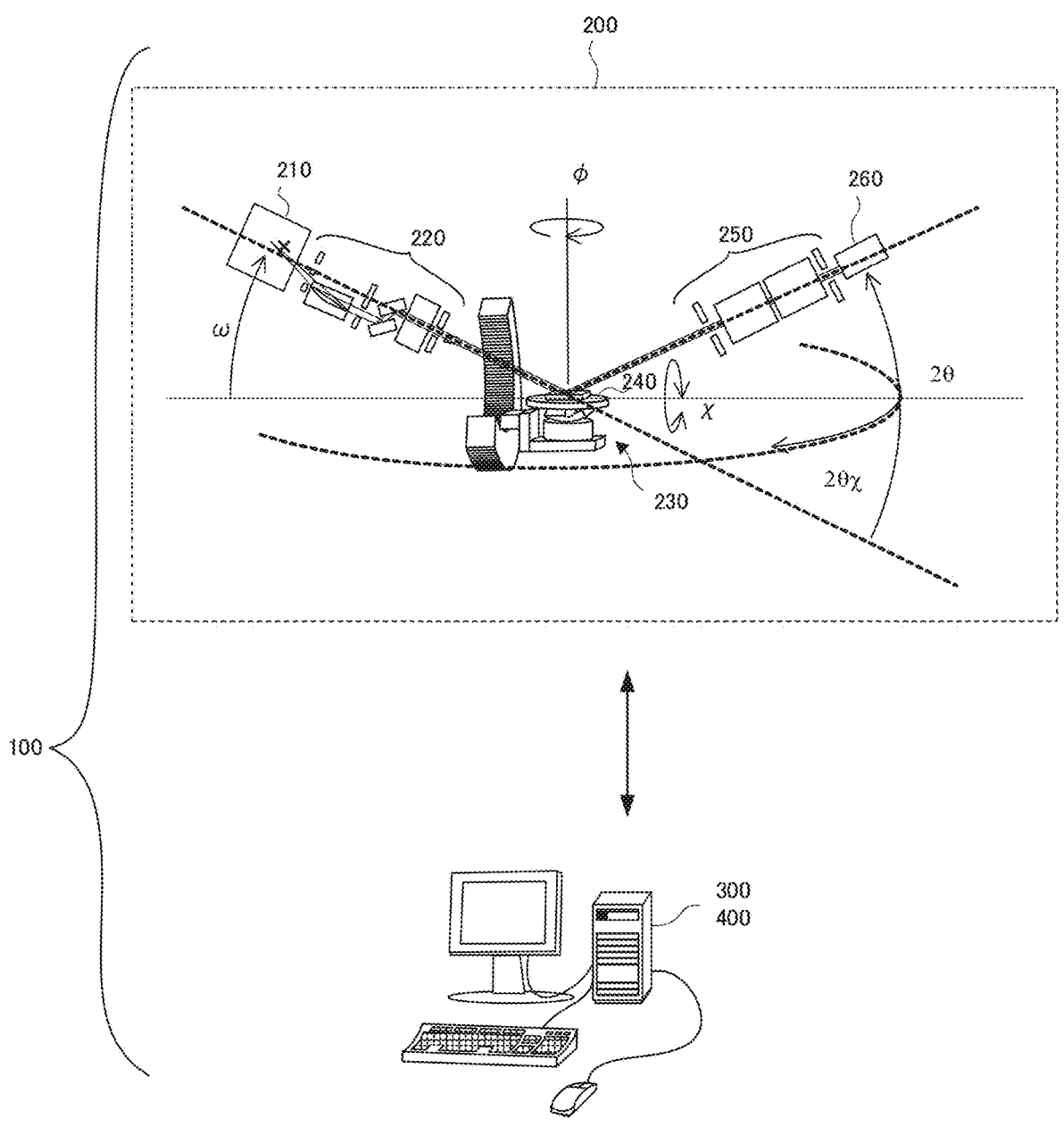
FIG. 1 is a schematic diagram showing an example of a configuration of the analysis system.

Next, embodiments of the present disclosure are described with reference to the drawings. To facilitate understanding of the description, the same reference numerals are assigned to the same components in the respective drawings, and duplicate descriptions are omitted.

[Principle]

X-ray reflectivity and small angle X-ray scattering have a large dynamic range of measurement data; the measurement intensity profile ranges from about 1.0 to $1.0 \times 10^7$. In these analyses, as long as the period of the fringe is visible even at a 10 counts level of intensity, it contains the information required for the analysis, and therefore, the section with low intensity cannot be ignored at the time of fitting.

In order to determine the shape of a sample by the X-ray measurement, it is necessary to solve the inverse problem using measurement data. Based on the shape and material of the sample to be measured, the sample is represented as a model including information on the electron density distribution. The calculated intensity is the reflected or scattered intensity when the model is irradiated with X-rays. The model is optimized by the least squares method so that the calculated intensity profile (calculation data) coincides well with the measured intensity profile (measurement data). Here, an index is required to evaluate how much the model has been optimized.

The index goodness-of-fit (GOF) indicating the optimization degree of the model including the information of the electron density distribution is calculated for the measurement data in which a probability distribution function followed by the measurement data is known. The fact that a probability distribution function followed by the measurement data is known means that the range of variation in measurement data can be statistically estimated from the values of the measurement data. Specifically, it indicates a case where it is known from the property of the measurement data that the measurement data follows Poisson distribution, Gaussian distribution or the like.

The GOF is represented by the following formula (5), for example. Here, the R (R factor) is a residual defined by a predetermined mathematical formula including measurement data and calculation data. The $R_G$ ($R_G$ factor) is an expected value of the residual defined based on a probability distribution function followed by measurement data and a predetermined formula. The GOF may be any one defined by a mathematical formula including a ratio of a residual including measurement data and calculation data to an expected value of the residual and is not limited to the mathematical formula (5). The ratio of the residual including measurement data and calculation data to the expected value of the residual may be either the ratio of $R_G$ to R or the ratio of R to $R_G$, for example, the reciprocal obtained by exchanging the denominator and the numerator in the formula (5) may be defined as GOF.

$$GOF = \frac{R}{R_G} \qquad (5)$$

Since the probability distribution function followed by the measurement data is known, an expected value of the residual defined based on the probability distribution function and a predetermined mathematical formula can be calculated. The $R_G$ can be defined to be an R factor calculated from the residual between the measurement data and the statistical error of the measurement data. The $R_G$ can be defined to be the smallest R factor estimated from the measurement data. Specific examples of the predetermined mathematical formulas and their expected values are detailed in the embodiments.

The GOF calculated as described above is an index indicating the optimization degree of the model. For example, it is possible to determine which of the two models generated for the same measurement data is better optimized. In addition, it is possible to evaluate whether or not the fitting of the model is sufficiently converged, and when the fitting of the model is not sufficiently converged, it is possible to update the parameters to generate the model again, calculate the calculation data, and determine the GOF. In addition, the GOF can be defined to be 1, regardless of the quality of the measurement data, if the fitting of the model is idealized. Therefore, it is possible to absolutely determine the optimization degree of the model even between different data. The GOF of the present disclosure is suitable as an indicator of analysis using a weighted least squares method. The detailed calculation method of the index according to the present disclosure is described in the embodiment.

In the following embodiments, the method for calculating the GOF using the measurement data measured by the X-ray analysis apparatus, the method for evaluating the convergence of the GOF and the method for optimizing the model using the evaluation of the convergence of the GOF are described. The present disclosure can be applied to not only the measurement data of the X-ray reflectivity and the small angle X-ray scattering measured by the X-ray analysis apparatus, but also the measurement data measured by a probe similar thereto. Specifically, it can be applied to the measurement data for which a probability distribution function followed by the measurement data is known, such as, for example, measurement data by photons.

EMBODIMENT

[Entire System]

FIG. 1 is a schematic diagram showing an example of a configuration of the analysis system 100. The system 100 comprises an X-ray analysis apparatus 200, a control apparatus 300, and an analysis apparatus 400. By using this system 100, it is possible to measure the measurement data and calculate an index GOF indicating the optimization degree of the model with respect to the measurement data for which probability distribution function followed by the measurement data is known. It is also possible to evaluate the GOF and optimize the model.

In FIG. 1, the control apparatus 300 and the analysis apparatus 400 are described as the same PC. However, as described above, in the method of the present disclosure, the measurement data and the calculation data can be acquired, and the index calculation can be performed independently of the X-ray analysis apparatus 200 and the control apparatus 300. Therefore, the analysis apparatus 400 may be configured as an apparatus different from the control apparatus 300. Hereinafter, a case where the control apparatus 300 and the analysis apparatus 400 are configured as different apparatuses is described.

[X-ray Analysis Apparatus]

The X-ray analysis apparatus 200 constitutes an optical system that makes X-rays incident on a sample and detects reflected X-rays generated from the sample. The X-ray analysis apparatus 200 comprises an X-ray generating section 210 that generates X-rays from an effective focus, that is, X-ray source, an incident side optical unit 220, a goniometer 230, a sample stage 240 on which a sample is placed, and a detector 260 that detects X-rays. The X-ray analysis apparatus 200 may comprise an exiting side optical unit 250. The X-ray generating section 210, the incident side optical unit 220, the goniometer 230, the sample stage 240, the exiting side optical unit 250, and the detector 260 that constitute the X-ray analysis apparatus 200 may be those generally available, and thus descriptions are omitted. Incidentally, the configuration shown in FIG. 1 is one example, and thus a variety of other configurations may be adopted.

The X-ray analysis apparatus 200 repeats the movement of the rotation axis and the projection of the X-ray under predetermined conditions. As a result, the sample is irradiated with X-rays, and measurement data such as X-ray reflectivity data and small angle X-ray scattering data is acquired. The X-ray analysis apparatus 200 transmits the apparatus information and the like and the acquired measurement data to the control apparatus 300.

[Control Apparatus]

The control apparatus 300 is connected to the X-ray analysis apparatus 200 and controls the X-ray analysis apparatus 200 and stores and displays the acquired data. In the system 100, when the analysis apparatus 400 does not have a function of generating a model and calculating calculation data, the control apparatus 300 or another apparatus (for example, a model generating apparatus) has a function of generating a model and calculating calculation data.

Figure 2:
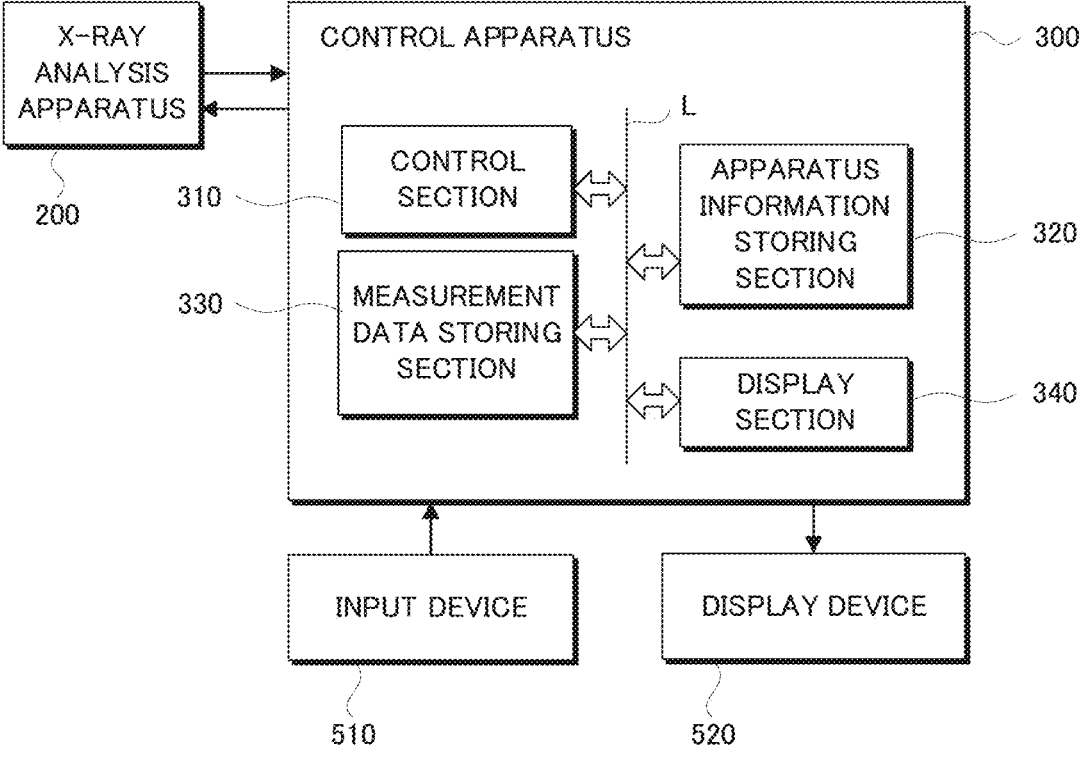
FIG. 2 is a block diagram showing one example of a configuration of the control apparatus.

FIG. 2 is a block diagram showing one example of a configuration of the control apparatus 300. The control apparatus 300 is constituted from a computer formed by connecting CPU (Central Processing Unit/Central Processor), ROM (Read Only Memory), RAM (Random Access Memory) and a memory to a bus. The control apparatus 300 is connected to the X-ray analysis apparatus 200 and receives information.

The control apparatus 300 comprises a control section 310, an apparatus information storing section 320, a measurement data storing section 330, and a display section 340. Each section can transmit and receive information via the control bus L. The input device 510 and the display device 520 are connected to CPU via an appropriate interface.

The control section 310 controls the operation of the X-ray analysis apparatus 200. The apparatus information storing section 320 stores apparatus information acquired from the X-ray analysis apparatus 200. The device information may include information about the X-ray analysis apparatus 200, such as apparatus name, source type, wavelength, background, etc.

The measurement data storing section 330 stores measurement data acquired from the X-ray analysis apparatus 200. Information about the X-ray analysis apparatus 200, such as source type, wavelength, background, etc. may be included along with the measurement data. The display section 340 displays the measurement data on the display device 520. Thus, the measurement data can be confirmed by a user. In addition, the user can instruct and designate the control apparatus 300, the analysis apparatus 400 and the like based on the measurement data.

[Analysis Apparatus]

The analysis apparatus 400 calculates an index GOF indicating the optimization degree of the model including the information of the electron density distribution with respect to the measurement data in which the probability distribution function followed by the measurement data is known. The control apparatus 300 and the analysis apparatus 400 are apparatuses comprising CPU and memories and may be PC terminals or servers on the cloud. Not only the whole apparatus but also part of the apparatus or some functions of the apparatus may be provided on the cloud. The input device 510 is, for example, a keyboard or a mouse, and performs input to the control apparatus 300 or the analysis apparatus 400. The display device 520 is, for example, a display and displays a model, a GOF and the like.

Embodiment 1

Figure 3:
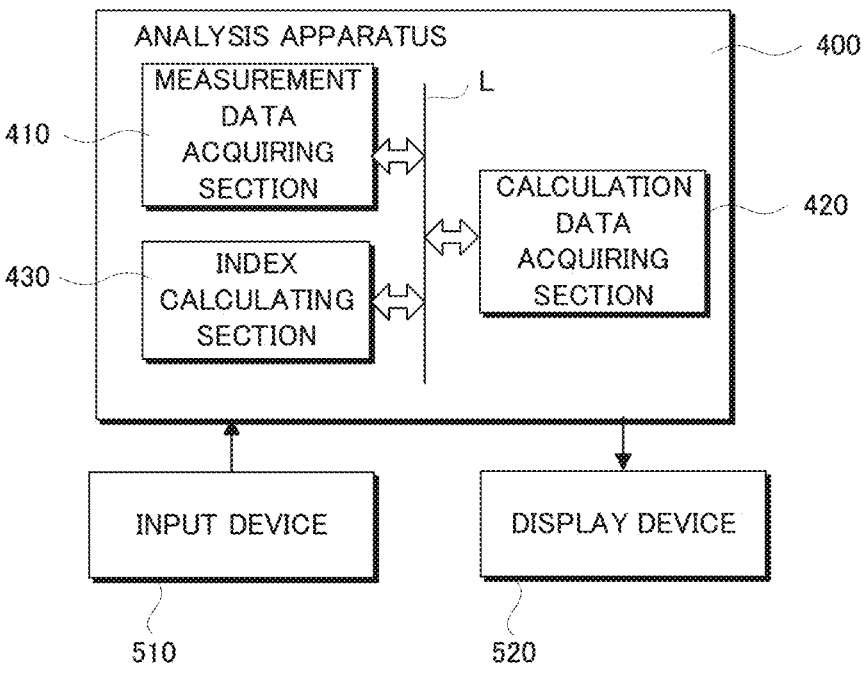
FIG. 3 is a block diagram showing an example of a configuration of the analysis apparatus according to the embodiment 1.

In the embodiment 1, only the calculation of the GOF is described. FIG. 3 is a block diagram showing an example of a configuration of the analysis apparatus 400 according to the embodiment 1. The analysis apparatus 400 is configured with a computer formed by connecting CPU, ROM, RAM and a memory to a bus. The analysis apparatus 400 may be connected to the X-ray analysis apparatus 200 via the control apparatus 300.

The analysis apparatus 400 comprises a measurement data acquiring section 410, a calculation data acquiring section 420, and an index calculating section 430. Each section can transmit and receive information via the control bus L. When the analysis apparatus 400 and the control apparatus 300 have different configurations, the input device 510 and the display device 520 are also connected to CPU of the analysis apparatus 400 via an appropriate interface. In this case, the input device 510 and the display device 520 each may differ from one connected to the control apparatus 300.

Figure 4:
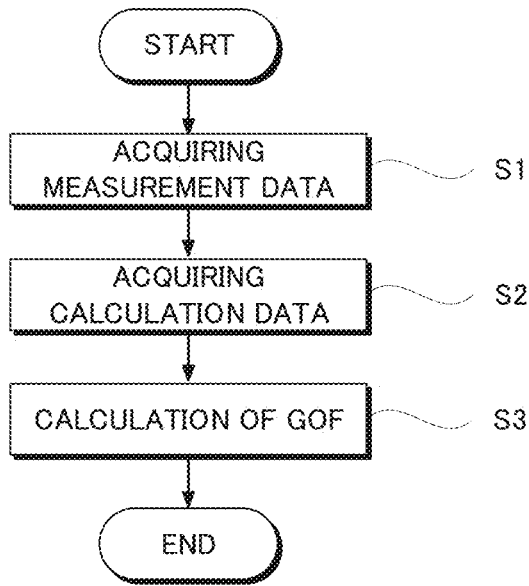
FIG. 4 is a flowchart showing an example of an operation of the analysis apparatus according to the embodiment 1.

FIG. 4 is a flowchart showing an example of an operation of the analysis apparatus 400 according to the embodiment 1. FIG. 4 shows an example of the operation in the case where only the calculation of GOF is performed. First, the analysis apparatus 400 acquires measurement data by the measurement data acquiring section 410 (step S1). Next, the calculation data acquiring section 420 acquires the calculation data (step S2). Next, the index calculating section 430 calculates the GOF (step S3).

The measurement data acquiring section 410 acquires measurement data. The measurement data acquiring section 410 may acquire the measurement data directly from the X-ray analysis apparatus 200 or via the control apparatus 300 or may acquire the measurement data stored in advance in a database or the like.

The calculation data acquiring section 420 acquires calculation data calculated from the model. The model is a model representing a characteristic of the sample from which the measurement data is measured. Specifically, it includes information on the electron density distribution derived from the shape, the material and the like of the sample. Further, information other than the electron density distribution such as the refractive index of the sample may be included. The calculation data are calculated as to what kind of reflection and scattering occurs when the model is irradiated with X-rays.

The index calculating section 430 calculates an index GOF including a ratio between a residual and an expected value of the residual, with respect to the residual defined by a predetermined mathematical formula including the measurement data and the calculation data, and the expected value of the residual defined based on the probability distribution function and the predetermined mathematical formula. The Formulas defining the predetermined mathematical formula, the expected value of the residual, or the formula defining the index GOF are stored in advance. Alternatively, a configuration may be adopted in which the user can arbitrarily set the predetermined mathematical formula or the like by selecting or instructing it.

Next, an example of the method for calculating the GOF using the measurement data measured by the X-ray analysis apparatus is described. The X-ray intensity of the measurement data measured by the X-ray analysis apparatus in the X-ray reflectivity or the small angle X-ray scattering is referred to as Obs, and the X-ray intensity of the calculation data calculated from the model is referred to as Calc. It is assumed that the model has already been generated. Further, a predetermined mathematical formula for fitting the model is represented by R. The predetermined mathematical formula includes the measurement data and the calculation data and is a formula that defines a residual for fitting a model. For example, R can be a formula obtained by dividing the sum of squared residuals of the logarithm of Obs and the logarithm of Calc by the sum of the logarithm intensity of Obs, as in the formula (6) below. As described above, the predetermined mathematical formula may include the sum of squared residuals of the logarithm of the measurement data and the logarithm of the calculation data. Obs; or Calc indicates Obs or Calc at the respective data point j.

$$R = \sqrt{\frac{\sum_j \{\log(Obs_j) - \log(Calc_j)\}^2}{\sum_j \{\log(Obs_j)\}^2}} \tag{6}$$

The probability distribution function f(x) followed by the counted X-ray intensity Obs of the measurement data is expressed by the Poisson distribution of the standard deviation $\sqrt{\text{(Ideal)}}$, when the mean value of the theoretical counted X-ray intensities is referred to as Ideal. When the Poisson distribution is approximated by a Gaussian distribution, the probability distribution function f(x) is expressed by the following formula (7) as $\sigma = \sqrt{\text{(Ideal)}}$. In this way, when the probability distribution function is a Poisson distribution, it is preferable to approximate the expected value of the residual by a Gaussian distribution. In this way, the integration of the Gaussian distribution can be solved analytically, which facilitates the implementation of the software. However, if the expected value of the residual including the measurement data and the calculation data can be calculated without being approximated by another function, the expected value of the residual may not be approximated by another function and may be directly calculated.

$$f(x) = \frac{1}{\sqrt{2\pi}\sigma} e^{-\frac{1}{2}\left(\frac{x-\text{Ideal}}{\sigma}\right)^2} \tag{7}$$

In the formula (6) above, a predetermined mathematical formula is defined to include the sum of squared residuals of the logarithm of Obs and the logarithm of Calc. Therefore, the sum of squared residuals of the logarithm of Obs and the logarithm of Ideal is considered as in the formula (8) below. Here, the expected value of the sum of squared residuals of the logarithm of Obs and the logarithm of Ideal is expressed by the formula (9) below.

$$\{\log(\text{Ideal}) - \log(Obs)\}^2 \tag{8}$$

$$\int \{\log(\text{Ideal}) - \log(x)\}^2 f(x) dx \tag{9}$$

In practice, since the Ideal is unknown, the Obs is substituted for the Ideal. When the expected value of the sum of squared residuals of logarithms is calculated at the respective data points j and the sum is divided by the sum of the logarithmic intensities, the value of $R_G$ expressed by the following formula (10), can be calculated as the ideal R for the above R. That is, $R_G$ is an expected value of the residual obtained by using the property of the probability distribution function for the residual defined by the predetermined mathematical formula including the measurement data and the calculation data. Therefore, $R_G$ may be defined in any way as long as it represents an expected value of the residual obtained by using the property of the probability distribution function. In the present disclosure, the expected value of the residual obtained by using the property of the probability distribution function is regarded to be an expected value of the residual defined based on the probability distribution function and a predetermined mathematical formula. Note that $\sigma$ in the formula (10) is $\sigma = \sqrt{(Obs_j)}$.

$$R_G = \sqrt{\frac{\sum_j \int \{\log(Obs_j) - \log(x)\}^2 \frac{1}{\sqrt{2\pi}\sigma} e^{-\frac{1}{2}\left(\frac{x-Obs_j}{\sigma}\right)^2} dx}{\sum_j \{\log(Obs_j)\}^2}} \tag{10}$$

For the above R and $R_G$, when the GOF is defined by the following formula (11), for example, the GOF is an index indicating the optimization degree of the model.

$$GOF = \frac{R}{R_G} \tag{11}$$

When the GOF is actually calculated, there is no need to calculate the R and $R_G$ respectively as described above and to use them to calculate the GOF. For example, when the GOF is defined in the formula (11) with respect to R and $R_G$ described above, the following formula (12) may be defined in advance as a mathematical formula for calculating the GOF, and the GOF may be calculated using the formula.

$$GOF = \sqrt{\frac{\sum_j \{\log(Obs_j) - \log(Calc_j)\}^2}{\sum_j \int \{\log(Obs_j) - \log(x)\}^2 \frac{1}{\sqrt{2\pi}\sigma} e^{-\frac{1}{2}\left(\frac{x-Obs_j}{\sigma}\right)^2} dx}} \tag{12}$$

In addition, when the predetermined mathematical formula is replaced with a different mathematical formula, the GOF is changed accordingly, but even if the predetermined mathematical formula is the same, the GOF can be defined to be different. For the R and $R_G$ described above, for example, the GOF may be represented by the following formula (13). As described above, the GOF may be any index including a ratio of the residual and the expected value of the residual with regard to the residual defined by a predetermined mathematical formula including the measurement data and the calculation data, and the expected value of the residual defined based on the probability distribution function and the predetermined mathematical formula.

$$GOF = \frac{\sum_j \{\log(Obs_j) - \log(Calc_j)\}^2}{\sum_j \int \{\log(Obs_j) - \log(x)\}^2 \frac{1}{\sqrt{2\pi}\sigma} e^{-\frac{1}{2}\left(\frac{x-Obs_j}{\sigma}\right)^2} dx} \tag{13}$$

In the following, another example of a predetermined mathematical formula is described. As described above, when the residual is calculated by the logarithm of the measurement data and the calculation data, the variation in the value becomes large when the intensity of the measurement data and the calculation data is small. For example, log $0=-\infty$ occurs, or log $2-\log\approx0.3$ is nearly doubled of log $3-\log 2\approx0.17$ even though the differences between the values of the logarithm should be the same by 1 count. As described above, as a method of reducing the influence of taking a logarithm for a small value, the predetermined mathematical formula can be expressed by, for example, the following mathematical formula (14). $W_j$ is the weight defined by the Obs; which is the counted X-ray intensity of the measurement data. $W_j$ is defined as, for example, the formula (15). e is the base of the natural logarithm.

$$R = \sqrt{\frac{\sum_j \{W_j(Obs_j - Calc_j)\}^2}{\sum_j W_j^2 Obs_j^2}} \quad (14)$$

$$W_j = \frac{\log(\max(e, Obs_j))}{\max(e, Obs_j)} \quad (15)$$

here, the expected value $R_G$ of the residual defined on the basis of the probability distribution function and the predetermined formula expressed by the formula (14) can be defined as in the following formula (16). For these R and $R_G$, the GOF can be defined. When the GOF is defined by the formula (11) with respect to the R and $R_G$, the mathematical formula for calculating the GOF is expressed by the formula (17) below, for example.

$$R_G = \sqrt{\frac{\sum_j \int \{W_j(Obs_j - x)\}^2 \frac{1}{\sqrt{2\pi}\sigma} e^{-\frac{1}{2}\left(\frac{x-Obs_j}{\sigma}\right)^2} dx}{\sum_j W_j^2 Obs_j^2}} \quad (16)$$

$$GOF = \sqrt{\frac{\sum_j \{W_j(Obs_j - Calc_j)\}^2}{\sum_j \int \{W_j(Obs_j - x)\}^2 \frac{1}{\sqrt{2\pi}\sigma} e^{-\frac{1}{2}\left(\frac{x-Obs_j}{\sigma}\right)^2} dx}} \quad (17)$$

The above approximation provides a more robust behavior by representing the residual with a linear-scale intensity when the intensity is less than or equal to e ($\approx$) 2.7 counts and taking the residual with a logarithmic intensity when the intensity e is more than the value e. As described above, it is preferable that the predetermined mathematical formula includes a weight parameter that multiplies the measurement data by a constant value when the measurement data has an intensity equal to or less than a predetermined value and takes a logarithm of the measurement data when the measurement data has an intensity more than the predetermined value. Note that the weight parameter in the formula (15) is the predetermined value e, but the predetermined value may be different from the value. Also, the formula indicating the weight parameter may be any formula and is not limited to the formula (15) as long as it multiplies the measurement data by a constant value when the measurement data has an intensity equal to or less than a predetermined value and takes a logarithm of the measurement data when the measurement data has an intensity more than the predetermined value. Note that the count value is basically an integer value, but in some cases, the count value is multiplied by the correction term, and in such cases, the value obtained by multiplying the correction term is regarded as the count value. Therefore, since the count value may be a fractional value, the predetermined value may also be a fractional value.

The calculation of the GOF may be performed directly from a formula that defines the GOF without calculating the residual defined by the predetermined mathematical formula including the measurement data and the calculation data and the expected value of the residual defined based on the probability distribution function and the predetermined mathematical formula. Thus, the GOF can be easily calculated. In this way, the GOF can be calculated based on the measurement data and the calculation data. As described above, by calculating the GOF, the user can confirm the optimization degree of the model regardless of the quality of the measurement data or the skill level of the user.

Embodiment 2

Figure 5:
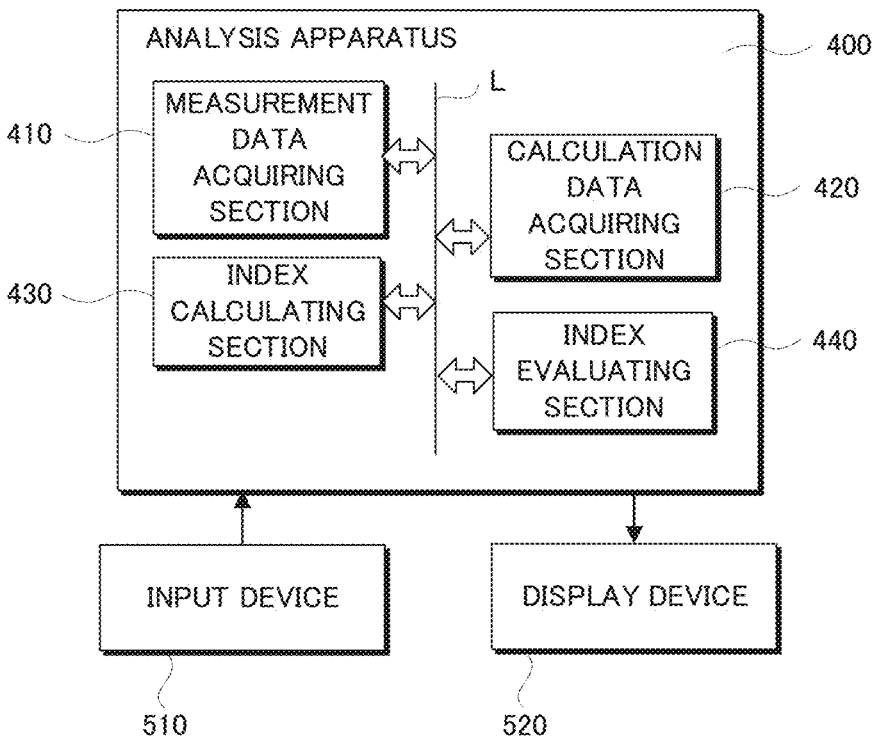
FIG. 5 is a block diagram showing an example of a configuration of the analysis apparatus according to the embodiment 2.

In the embodiment 2, the case where the convergence of the GOF is evaluated is described. A lot of procedures are similar to those in the embodiment 1, and thus only different points are described. FIG. 5 is a block diagram showing an example of a configuration of the analysis apparatus 400 according to the embodiment 2. As shown in FIG. 5, the analysis apparatus 400 may comprise an index evaluating section 440 in addition to the measurement data acquiring section 410, the calculation data acquiring section 420 and the index calculating section 430. Note that the analysis apparatus 400 having the configuration of FIG. 5 may be referred to as an index evaluation apparatus.

Figure 6:
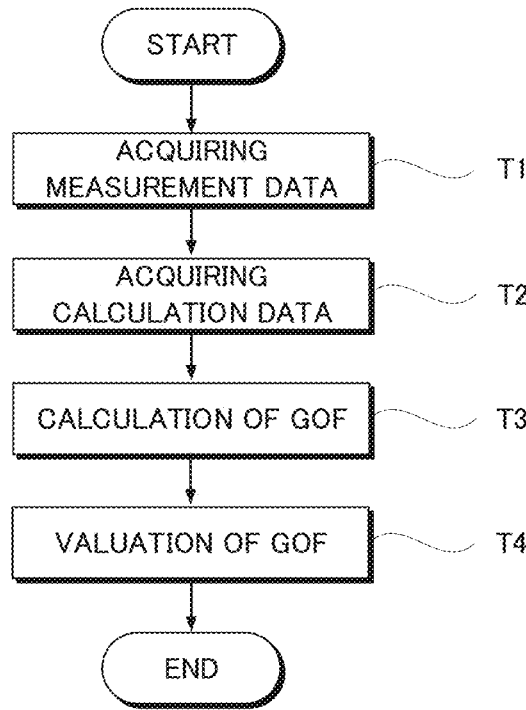
FIG. 6 is a flowchart showing an example of an operation of the analysis apparatus according to the embodiment 2.

FIG. 6 is a flowchart showing an example of an operation of the analysis apparatus 400 according to the embodiment 2. FIG. 6 shows an example of the operation when the convergence of the GOF is evaluated after the calculation of the GOF. First, the analysis apparatus 400 acquires the measurement data by the measurement data acquiring section 410 (step T1). Next, the calculation data acquiring section 420 acquires the calculation data (step T2). Next, the index calculating section 430 calculates the GOF (step T3). The operation up to this point is the same as above.

Next, the index evaluating section 440 evaluates convergence of the GOF (step T4). In this way, the convergence of the GOF can be evaluated. The evaluation criterion for the convergence of the GOF may be set in advance or may be set arbitrarily by the user selecting an evaluation criterion for the convergence, such as a predetermined threshold, or the like. The index evaluating section 440 may output an evaluation of the convergence of the GOF.

Next, an example of the method of evaluating the convergence of the GOF is described. The assessment of the convergence of the GOF depends on the definition of the GOF and the definition of the convergence. For example, when the GOF is defined in the formula (11), if the fitting is perfect, then the GOF is 1. Thus, the convergence of the GOF can be defined by whether the GOF is sufficiently close to 1. When the convergence is evaluated by such a definition, for example, the predetermined thresholds a and b can be set, and it can be evaluated that the convergence has occurred when the absolute value of the difference between the GOF and the predetermined threshold a is equal to or less than the predetermined threshold b. It is preferable that the threshold a is a value of the GOF when the fitting is perfect.

Further, it is also possible to define the convergence of the GOF based on whether differences between GOF1 calculated based on a certain model and GOF2 calculated based on the updated model are sufficiently small. When the convergence is evaluated by such a definition, for example, a predetermined threshold c is set, and it can be evaluated that the convergence is achieved when the absolute value of the difference between GOF1 and GOF2 becomes equal to or less than c.

In this way, by evaluating the convergence of the GOF, it is possible for the user to determine whether or not regeneration of the model is required.

Embodiment 3

Figure 7:
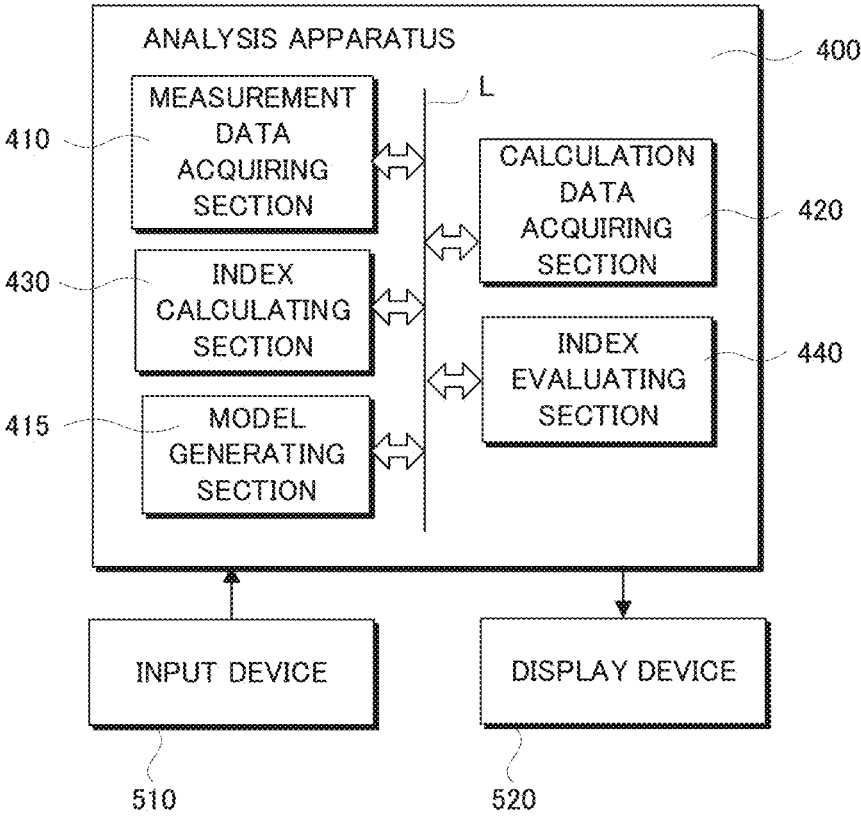
FIG. 7 is a block diagram showing an example of a configuration of the analysis apparatus according to the embodiment 3.

In the embodiment 3, a case where optimization of a model is performed is described. Since many procedures are the same as in the embodiment 1 and embodiment 2, only the differences are described. FIG. 7 is a block diagram showing an example of a configuration of the analysis apparatus 400 according to the embodiment 3. As shown in FIG. 7, the analysis apparatus 400 may comprise a model generating section 415 in addition to the measurement data acquiring section 410, the calculation data acquiring section 420, the index calculating section 430, and the index evaluating section 440.

Figure 8:
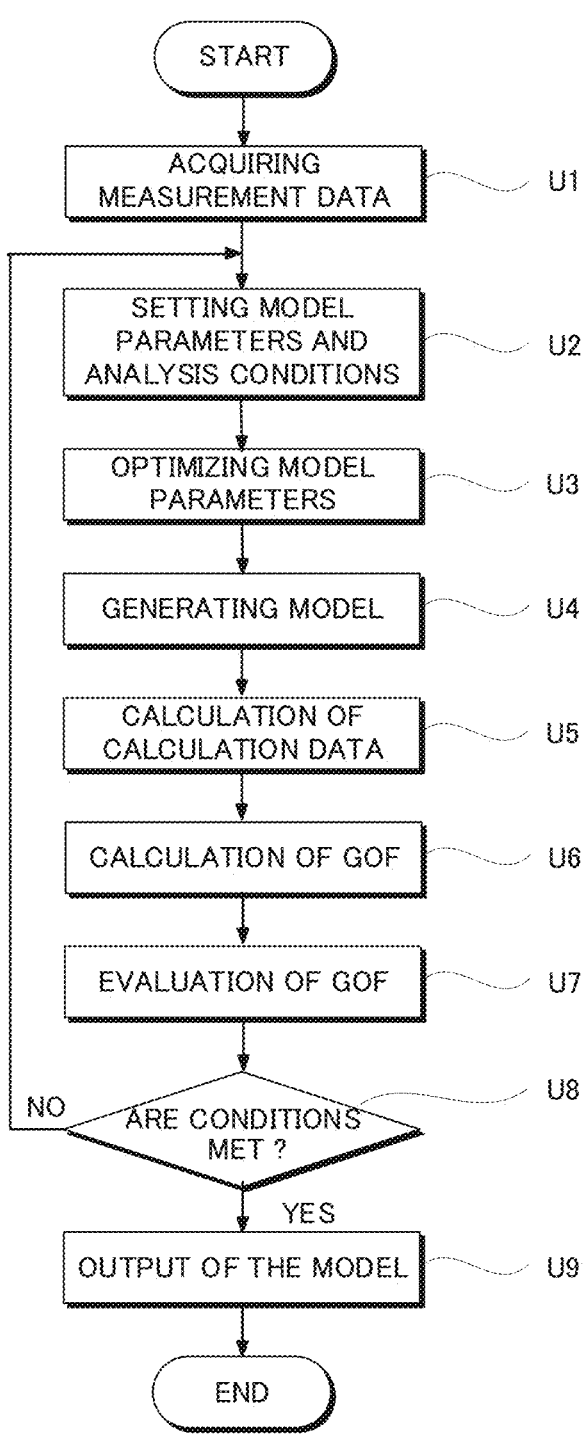
FIG. 8 is a flowchart showing an example of an operation of the analysis apparatus according to the embodiment 3.

FIG. 8 is a flowchart showing an example of an operation of the analysis apparatus 400 according to the embodiment 3. FIG. 8 shows an example of an operation performed when the index evaluation apparatus optimizes a model. First, the analysis apparatus 400 acquires measurement data by the measurement data acquiring section 410 (step U1). Next, the model generating section 415 sets model parameters and analysis conditions (step U2). The model parameters or the analysis conditions may be arbitrarily set by the user selecting, specifying, inputting, or the like.

The model parameter is a parameter necessary for representing the sample as a model including information on an electron density distribution and is, for example, a parameter indicating a shape of the sample or a parameter indicating a material of the sample. The model parameters are, CD (Critical Dimension), depth or height, centerline position, etc. The analysis condition is, for example, a range of measurement data used for analysis, a constraint condition of a model parameter, a magnitude of a weight to be applied to each diffracted ray, and the like. The constraint condition of the model parameter is a condition set so as to restrict the model parameter from being larger or smaller than a certain value, or to limit the width in which the parameter can change every step of the repetitive analysis so that the value of the parameter does not change abruptly.

Next, the optimization of the model parameters is performed (step U3). The optimization of the model parameters can be performed, for example, by a least squares method. Next, the model generating section 415 generates a model (step U4). The model is generated based on the optimized model parameters. The calculation data is then calculated (step U5). The calculation data is calculated based on the type and the wavelength of the source, the shape and the composition of the model and the like of the measurement data.

Next, the index calculating section 430 calculates the GOF (step U6). The calculation of the GOF is the same as in the step S3. Next, the index evaluating section 440 evaluates the convergence of the GOF (step U7). The assessment of the convergence of GOF is similar to the step T4.

Next, if the convergence of the GOF is not evaluated to satisfy the condition (step U8-NO), the process returns to the step U2, and the model parameters and the analysis condition are set (updated). Then, a model is generated (regenerated) using the updated model parameters, and the process up to the step U7 are repeated.

On the other hand, if the convergence of the GOF is evaluated to satisfy the condition (step U8—YES), a model is outputted as needed (step U9), and the process ends. In this way, the model can be optimized. When the convergence of the GOF is evaluated based on the GOF before and after the updating, the convergence of the GOF may not be evaluated in the first round of the loops. In such cases, the second round of the loops may be configured to always be performed.

The model generating section 415 optimizes the model parameters. The model generating section 415 generates a model and calculates calculation data based on the generated model. The model is generated based on the model parameters. The calculation data is calculated based on the type and the wavelength of the source, the shape and the composition of the model and the like of the measurement data. Here, the calculation data acquiring section 420 acquires the calculation data calculated by the model generating section 415.

When the index evaluating section 440 evaluates that the GOF is not converged, the model generating section 415 updates the analysis conditions and the model parameters, optimizes the model parameters, generates (regenerates) the model and calculates (recalculates) the calculation data. At this time, the index calculating section 430 calculates the GOF again based on the calculated (recalculated) calculation data. When the index evaluating section 440 evaluates that the GOF has converged, the model generating section 415 outputs the model as needed. In this way, the analysis apparatus 400 can optimize the model based on the assessment of the convergence of the GOF. In addition, the analysis apparatus 400 can automatically optimize the model without the convergence confirmation of the user. The analysis apparatus 400 having the configuration shown in FIG. 7 may be referred to as a model optimization apparatus.

Next, an example of the method for optimizing the GOF by using the evaluation of the convergence is described. First, the analysis conditions and the model parameters are set. The model parameters are then optimized. The optimization of the model parameters can be performed, for example, by the least squares method. Next, a model is generated based on the optimized model parameters. The calculation data is then calculated from the model. Then, the GOF is calculated using the measurement data and the calculation data. The GOF is calculated as defined above. The calculated convergence of the GOF is evaluated, and if it is determined that the convergence has occurred, the model is output as needed, and the process ends.

On the other hand, the convergence of the calculated GOF is evaluated, and when it is evaluated that the convergence is not achieved, the analysis conditions and the model parameters are updated. The updated model parameters are then optimized. Next, a model is generated (updated) based on the optimized model parameters. Next, the calculation data is calculated from the updated model. Then, the GOF is calculated using the measurement data and the calculation data. The model parameters may be updated randomly or may be updated based on the GOF. In addition, when there are a plurality of datasets of the measurement data and the calculation data as in the case where there are a plurality of intensity profiles, it is possible to calculate one GOF collectively for all the data sets, or it is also possible to calculate a GOF for each of the corresponding measurement data and calculation data. When calculating the GOF for each corresponding the measurement data and the calculation data, the model parameters may be updated with weights so as to emphasize diffracted ray or data set for which the GOF values are far from convergence, that is, the optimization degree is low. For example, the weight that multiplies the residuals by a constant value is applied for a diffracted ray or dataset where the value of the GOF is far from convergence.

As described above, by optimizing the model using the evaluation of the GOF convergence, it is possible to generate an optimized model based on the objective index GOF regardless of the quality of the measurement data or the skill level of the user.

EXAMPLE

The convergence process of the analysis using the simulation data was examined using the index calculation apparatus configured as described above. First, a calculation data is generated based on the analysis result (model) of an existing sample. Next, statistical noise (random number according to Poisson distribution) was added to the calculation data to generate a dummy measurement data. Next, a least squares method fitting was carried out on the generated dummy measurement data using a simple cylinder as an initial model, and the model which became the origin of the calculation data generation was restored.

Figure 9A:
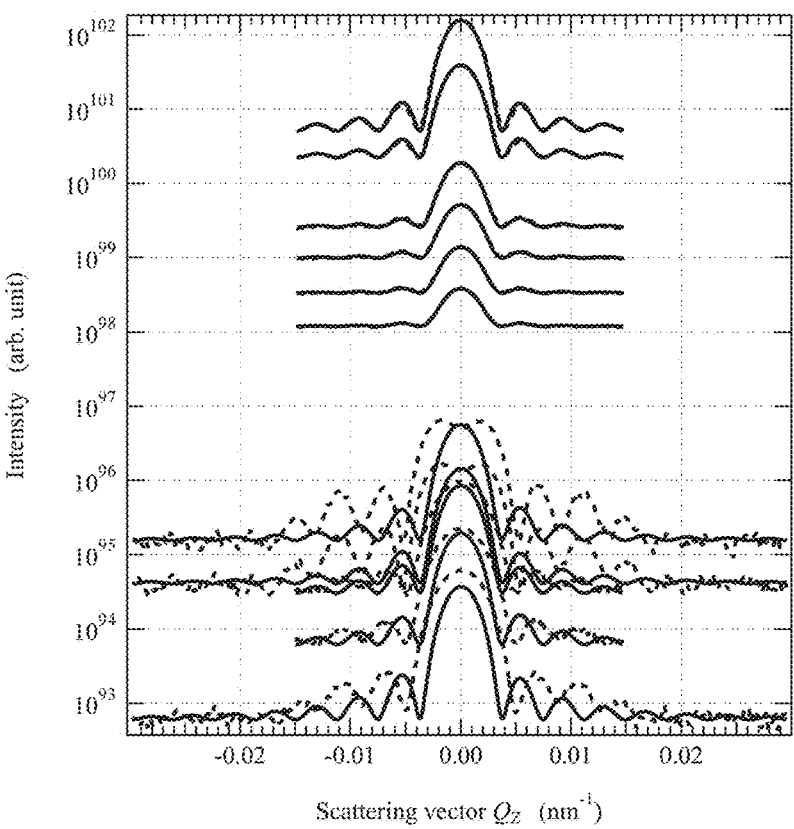
FIG. 9A is a graph showing a dummy measurement data and a calculation data prior to model optimization.
Figure 9B:
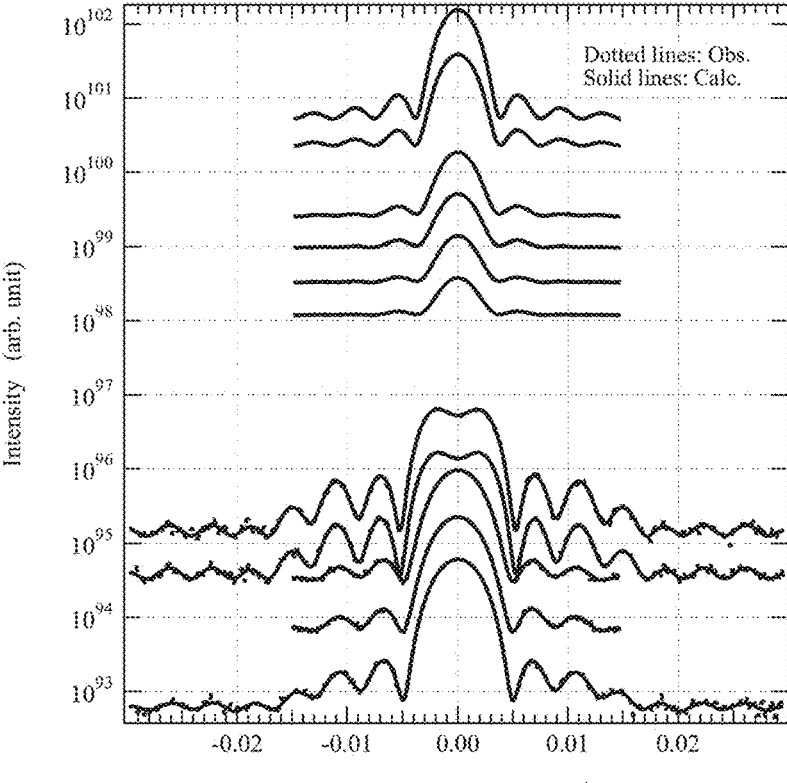
FIG. 9B is a schematic diagram showing a dummy measurement data and a calculation data after model optimization.

FIG. 9A is a graph showing a dummy measurement data and a calculation data prior to model optimization. FIG. 9B is a schematic diagram showing a dummy measurement data and a calculation data after model optimization. The analysis was performed in the following three steps.

1. A trapezoidal fitting that linearly changes the diameter at each depth is performed.
2. Fitting with free variation of diameter at each depth is performed.
3. For diffracted rays of which the GOF is more than 1, the residual is applied weighting to multiply by a constant value to exceed the local minimum, and the fitting is performed.

Figure 10:
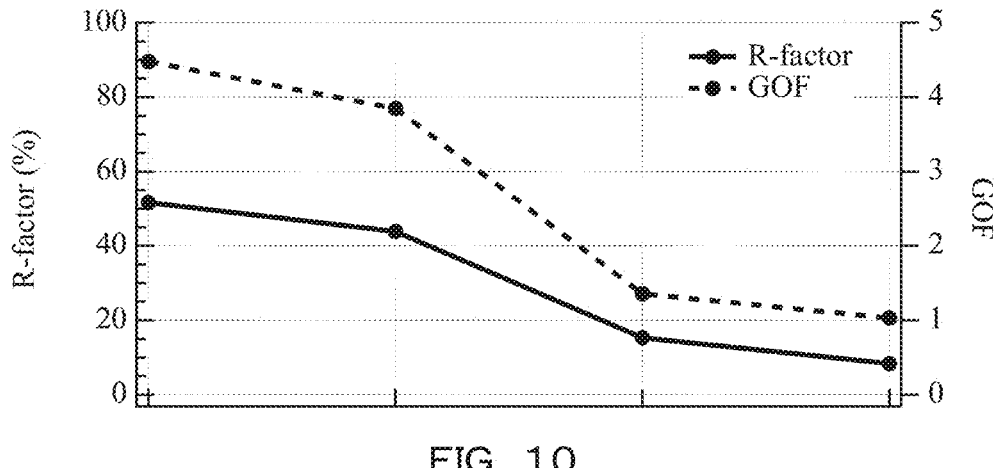
FIG. 10 is a graph showing changes in the values of the R factor and the GOF corresponding to one diffracted ray in the analysis process of the example.

FIG. 10 is a graph showing changes in the values of the R factor and the GOF corresponding to one diffracted ray in the analysis process of the example. The GOF at the end of the analysis was 1.03, and it was possible to determine that the analysis was sufficiently converged because the value was extremely close to 1 regardless of the skill level of the user. In comparison, the R factor at the end of the analysis is 8.39%, and only the factor does not enable discriminating the end of the analysis. Since the skilled user conventionally determines the end of the analysis by visually confirming the measurement data and the calculation data in this state, it can be confirmed that the skill level of the user is not required for determining the convergence in the method of the present disclosure.

Figure 11:
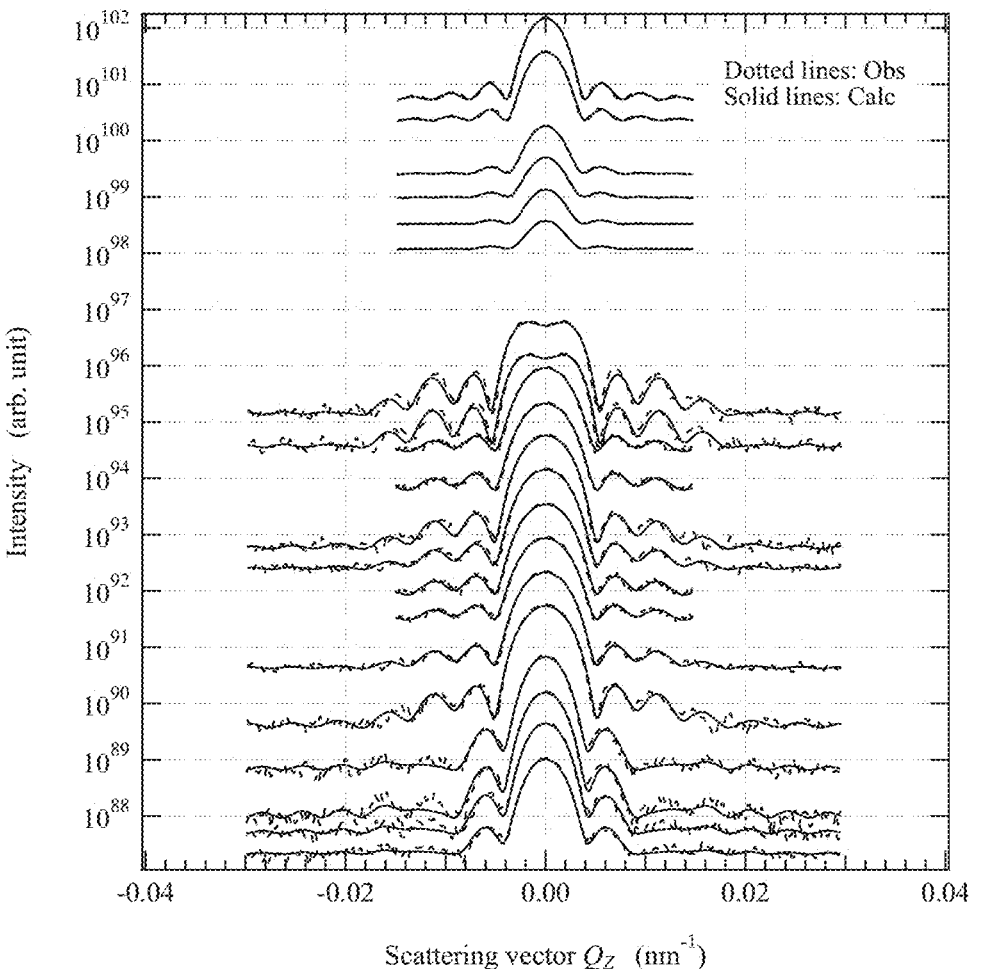
FIG. 11 is a graph superimposing a measurement data and a calculation data in a certain stage of the example.

FIG. 11 is a graph superimposing a measurement data and a calculation data in a certain stage of the example. The measurement data and the calculation data plot in FIG. 11 shows the overlay of the measurement data and the calculation data in a state where the analysis is advanced to some extent. In the graph shown in FIG. 11, only some data used for the analysis are displayed. The actual simulation was performed using 162 diffracted rays. As seen in FIG. 11, the measurement data and the calculation data appeared to coincide with each other to some extent visually.

Figure 12:
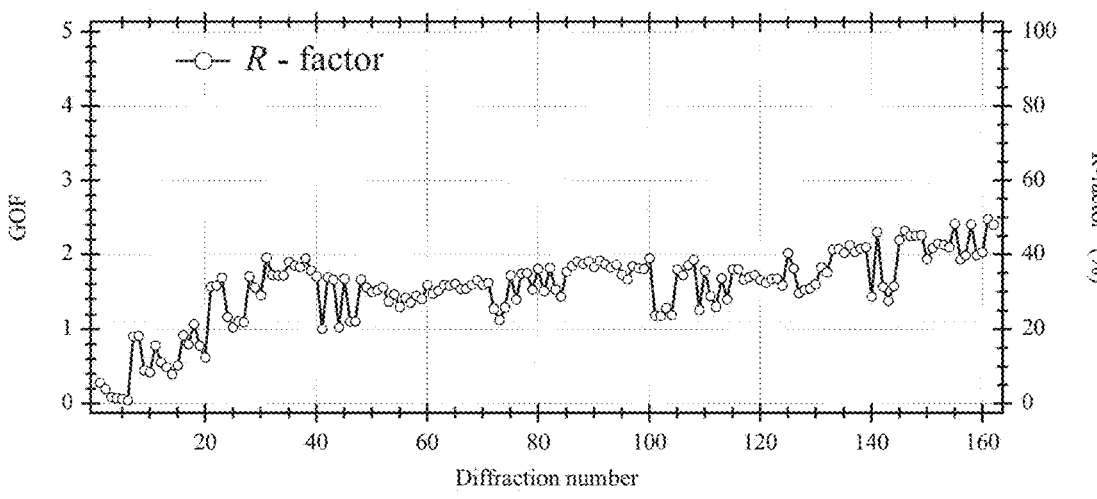
FIG. 12 is a graph showing the values of all the R factors used in the analysis at a certain stage.

On the other hand, FIG. 12 is a graph showing the values of all the R factors used in the analysis at a certain stage. In FIG. 12, the values of the R factor at the same stage as in FIG. 11 are plotted. As shown in FIG. 12, since the intensities are different for each diffracted ray, the value of the R factor varies covering a large range. Therefore, it was not possible to determine which diffracted ray the deviation between the calculated value and the measured value is large at.

Figure 13:
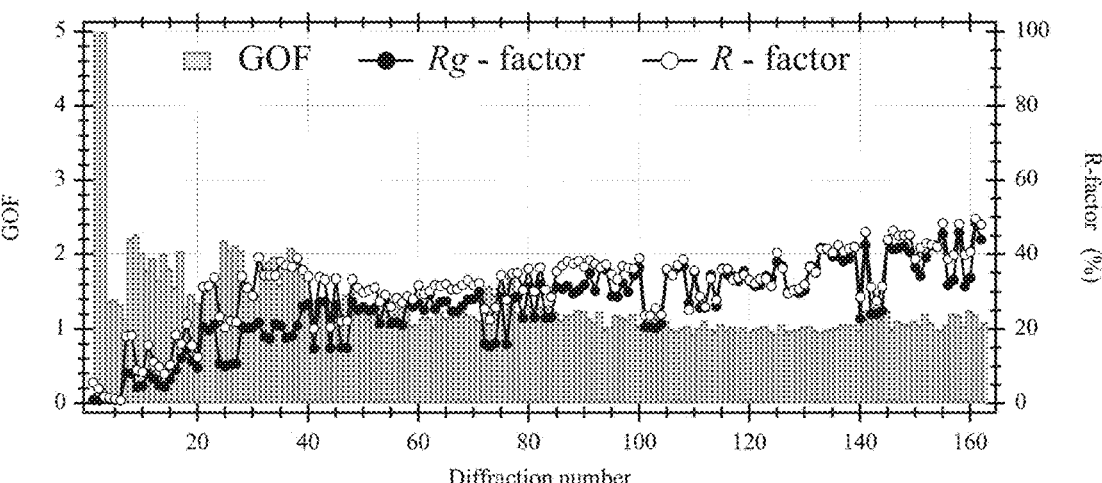
FIG. 13 is a graph showing values of all the R factors, the $R_G$ factors and the GOF used in the analysis at a certain stage.

FIG. 13 is a graph showing values of all the R factors, the $R_G$ factors and the GOF used in the analysis at a certain stage. In FIG. 13, the $R_G$ factors and the GOF are calculated and plotted for each diffracted rays in addition to the R factors in the same steps as in FIG. 11. In the view of FIG. 13, it can be seen that there is a section where the GOF greatly exceeds 1 (local minimum).

Figure 14:
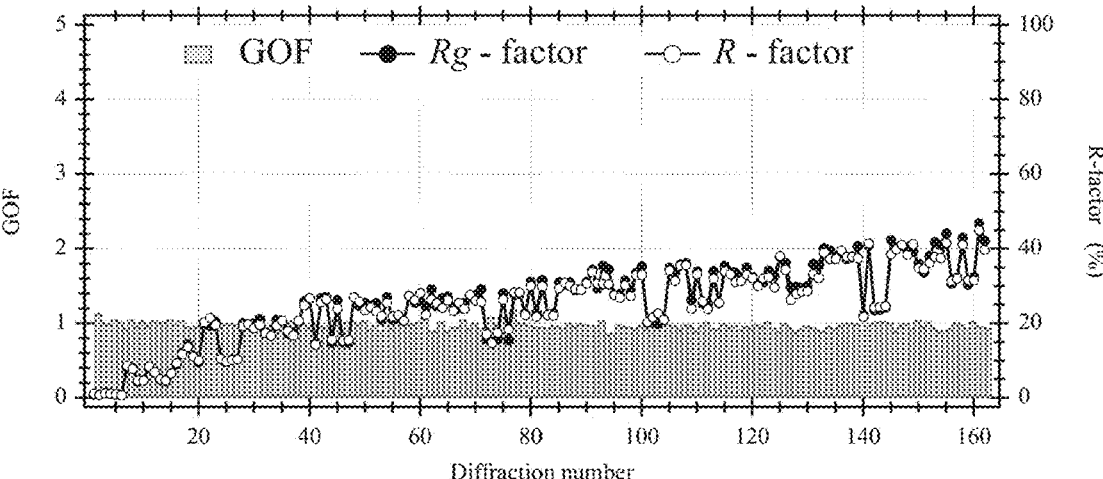
FIG. 14 is a graph showing values of all the R factors, the $R_G$ factors and the GOF used in the analysis after optimization calculation.

For diffracted rays with the GOF greater than 1, the optimization calculation was performed again with weights multiplying the residuals by a constant value. This is because the larger the residual, the larger the effect in the optimization calculation, so that an optimization result in which the weighted diffracted rays are fitted more intensely is obtained. After the optimization calculation, the weights were removed and the GOF was calculated again. FIG. 14 is a graph showing values of all the R factors, the $R_G$ factors and the GOF used in the analysis after optimization calculation. As shown in FIG. 14, the GOFs of all the diffracted rays were sufficiently close to 1, and it was determined that they converged. Thus, by using the GOF, the convergence was performed to the correct solution beyond the local minimum.

From the above results, it was confirmed that the index calculation apparatus, system, method, and program of the present disclosure can calculate an absolute convergence evaluation index applicable to measurement data in such as X-ray reflectivity and small angle X-ray scattering.

What is claimed is:

1. An analysis apparatus for calculating an index indicating an optimization degree of a model including information of an electron density distribution with respect to measurement data, a probability distribution function followed by the measurement data being known, comprising:
   processing circuitry configured to
   acquire the measurement data,
   acquire calculation data calculated from the model, and
   calculate an index goodness-of-fit (GOF) including a ratio of a residual, which is defined by a predetermined mathematical formula including the measurement data and the calculation data, and an expected value of the residual, which is defined based on the probability distribution function and the predetermined mathematical formula,
   wherein the predetermined mathematical formula includes a sum of squared residuals of a logarithm of the measurement data and a logarithm of the calculation data.

2. The analysis apparatus according to claim 1, wherein the processing circuitry is further configured to evaluate convergence of the GOF.

3. The analysis apparatus according to claim 1, wherein the probability distribution function is a Poisson distribution, and the processing circuitry is further configured to calculate an expected value of the residual by approximating the expected value with a Gaussian distribution.

4. A system comprising, an X-ray analysis apparatus comprising an X-ray generating section for generating X-rays, a sample table for placing a sample, and a detector for detecting X-rays, and an analysis apparatus according to claim 1.

5. The analysis apparatus according to claim 2, wherein the processing circuitry is further configured to generate the model and calculate the calculation data based on the generated model, acquire the calculation data, output the model in a case that the GOF has converged, update a model parameter of the model, generate the model and calculate the calculation data in a case that the GOF has not converged, and calculate the GOF based on the calculated calculation data.

6. An analysis apparatus for calculating an index indicating an optimization degree of a model including information of an electron density distribution with respect to measurement data, a probability distribution function followed by the measurement data being known, comprising:

processing circuitry configured to acquire the measurement data, acquire calculation data calculated from the model, and calculate an index goodness-of-fit (GOF) including a ratio of a residual, which is defined by a predetermined mathematical formula including the measurement data and the calculation data, and an expected value of the residual, which is defined based on the probability distribution function and the predetermined mathematical formula, wherein the predetermined mathematical formula includes a weight parameter that multiplies the measurement data by a constant value when the measurement data has an intensity equal to or less than a predetermined value and that takes a logarithm of the measurement data when the measurement data has an intensity more than the predetermined value.

7. A method for calculating an index indicating an optimization degree of a model including information of an electron density distribution with respect to measurement data, a probability distribution function followed by the measurement data being known, comprising:

acquiring the measurement data, acquiring calculation data calculated from the model, and calculating an index goodness-of-fit (GOF) including a ratio of a residual, which is defined by a predetermined mathematical formula including the measurement data and the calculation data, and an expected value of the residual, which is defined based on the probability distribution function and the predetermined mathematical formula, wherein the predetermined mathematical formula includes a sum of squared residuals of a logarithm of the measurement data and a logarithm of the calculation data.

8. A non-transitory computer-readable storage medium storing computer-readable instructions thereon for calculating an index indicating an optimization degree of a model including information of an electron density distribution with respect to measurement data, a probability distribution function followed by the measurement data being known which, when executed by a computer, causes the computer to perform a method, the method comprising:

acquiring the measurement data, acquiring calculation data calculated from the model, and calculating an index goodness-of-fit (GOF) including a ratio of a residual, which is defined by a predetermined mathematical formula including the measurement data and the calculation data, and an expected value of the residual, which is defined based on the probability distribution function and the predetermined mathematical formula, wherein the predetermined mathematical formula includes a sum of squared residuals of a logarithm of the measurement data and a logarithm of the calculation data.

9. The non-transitory computer-readable storage medium of claim 8, further comprising:

evaluating convergence of the GOF.

10. The non-transitory computer-readable storage medium of claim 8, wherein the probability distribution function is a Poisson distribution, further comprising:

calculating an expected value of the residual by approximating the expected value with a Gaussian distribution.

11. The non-transitory computer-readable storage medium of claim 9, further comprising:

generating the model and calculate the calculation data based on the generated model;

acquiring the calculation data;

outputting the model in a case that the GOF has converged;

updating a model parameter of the model, generate the model and calculate the calculation data in a case that the GOF has not converged; and calculating the GOF based on the calculated calculation data.

* * * * *